(12) United States Patent
Srabstein

(10) Patent No.: US 8,322,749 B2
(45) Date of Patent: Dec. 4, 2012

(54) INTEGRAL PROTECTION REMOVABLE SYSTEM FOR MOTOR VEHICLES WITHOUT BODY SHELL

(76) Inventor: Amadeo José Srabstein, Buenos Aires (AR)

( * ) Notice: Subject to any disclaimer, the term of this patent is extended or adjusted under 35 U.S.C. 154(b) by 85 days.

(21) Appl. No.: 13/044,171

(22) Filed: Mar. 9, 2011

(65) Prior Publication Data

US 2011/0221177 A1    Sep. 15, 2011

(51) Int. Cl.
*B60R 21/13* (2006.01)
(52) U.S. Cl. .......................................................... 280/756
(58) Field of Classification Search .................. 280/755, 280/756
See application file for complete search history.

(56) References Cited

U.S. PATENT DOCUMENTS

| | | | |
|---|---|---|---|
| 1,473,956 A * | 11/1923 | Eyre et al. ................... | 280/288.4 |
| 2,783,056 A | 2/1957 | Belk | |
| 3,284,130 A | 11/1966 | Michael | |
| 3,561,785 A | 2/1971 | Kidder | |
| 4,313,517 A | 2/1982 | Pivar | |
| 4,327,931 A | 5/1982 | Winiecki | |
| 4,412,595 A | 11/1983 | Kinzel | |
| 4,416,465 A | 11/1983 | Winiecki | |
| 4,560,196 A | 12/1985 | Carter | |
| 4,673,190 A | 6/1987 | Ahlberg | |
| 4,778,214 A | 10/1988 | Fu | |
| 4,798,399 A | 1/1989 | Cameron | |
| 4,813,706 A | 3/1989 | Kincheloe | |
| 4,973,082 A * | 11/1990 | Kincheloe ................... | 280/756 |
| 5,257,671 A | 11/1993 | Watkins | |
| 5,458,390 A | 10/1995 | Gilbert | |
| 5,503,430 A | 4/1996 | Miki et al. | |
| 5,685,388 A | 11/1997 | Bothwell et al. | |
| 5,743,561 A | 4/1998 | Kim | |
| 5,791,718 A | 8/1998 | Boutin | |
| 5,904,392 A | 5/1999 | Mainwal | |
| 5,961,175 A * | 10/1999 | Clardy, Jr. ..................... | 296/102 |
| 6,010,173 A | 1/2000 | Chyan-Luen | |
| 6,142,253 A | 11/2000 | Mueller et al. | |
| 6,325,441 B1 | 12/2001 | Ugolini | |
| 6,402,220 B2 * | 6/2002 | Allen ........................... | 296/77.1 |
| 6,543,830 B1 * | 4/2003 | Stuck ........................... | 296/77.1 |
| 6,565,139 B2 * | 5/2003 | Bayerle et al. ............... | 296/77.1 |
| 6,598,927 B2 | 7/2003 | Kurohori et al. | |
| 6,764,099 B2 | 7/2004 | Akiyama | |
| 7,175,200 B1 | 2/2007 | Obershan | |

(Continued)

FOREIGN PATENT DOCUMENTS

CZ    2264 U1    10/1994

(Continued)

*Primary Examiner* — Faye M. Fleming
(74) *Attorney, Agent, or Firm* — Egbert Law Offices, PLLC

(57) ABSTRACT

An integral protection removable system for motor vehicles without body shell, which comprises a plurality of longitudinal, transversal and diagonal bars, both removable and combinable to each other, which cover the sides below and above the height of the seat of the vehicle and which define, as a whole, a substantially ovoid configuration having its spherical end directed to the back of the vehicle and its oval end directed to the front part of the vehicle, capable to incorporate covering panels, fixed and/or removable, capable of guaranteeing a high resistance to all kind of impacts and providing a safety structure which is comfortable, practical and with novel performance, with the exclusive characteristic in the field of cages of integral protection for motor vehicles of forming a totally modular structure capable to be removed from the chassis of the vehicle.

8 Claims, 12 Drawing Sheets

U.S. PATENT DOCUMENTS

2010/0096200 A1  4/2010  Bombarda

FOREIGN PATENT DOCUMENTS

| | | |
|---|---|---|
| DE | 3431406 A1 | 3/1986 |
| DE | 4222253 A1 | 1/1994 |
| DE | 19505448 A1 | 8/1996 |
| DE | 19629879 A1 | 1/1998 |
| DE | 202007002826 U1 | 2/2007 |
| DE | 202008012695 U1 | 6/2009 |
| EP | 0820924 A2 | 1/1998 |
| ES | 2335821 T3 | 4/2010 |
| FR | 2649064 A1 | 1/1991 |
| WO | 2006049079 A1 | 5/2006 |
| WO | 2007129193 A1 | 11/2007 |
| WO | 2008012624 A2 | 1/2008 |

* cited by examiner

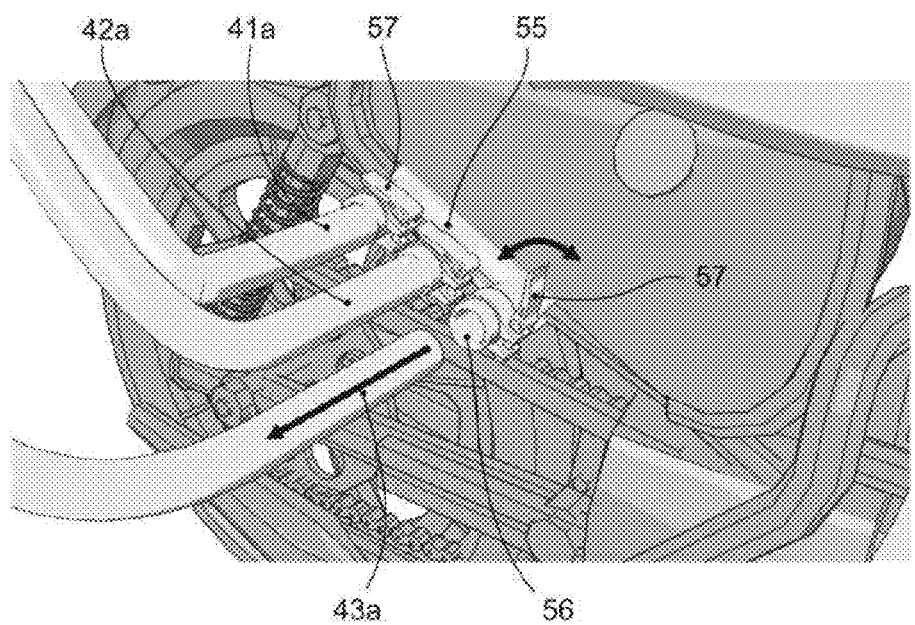
Fig 14
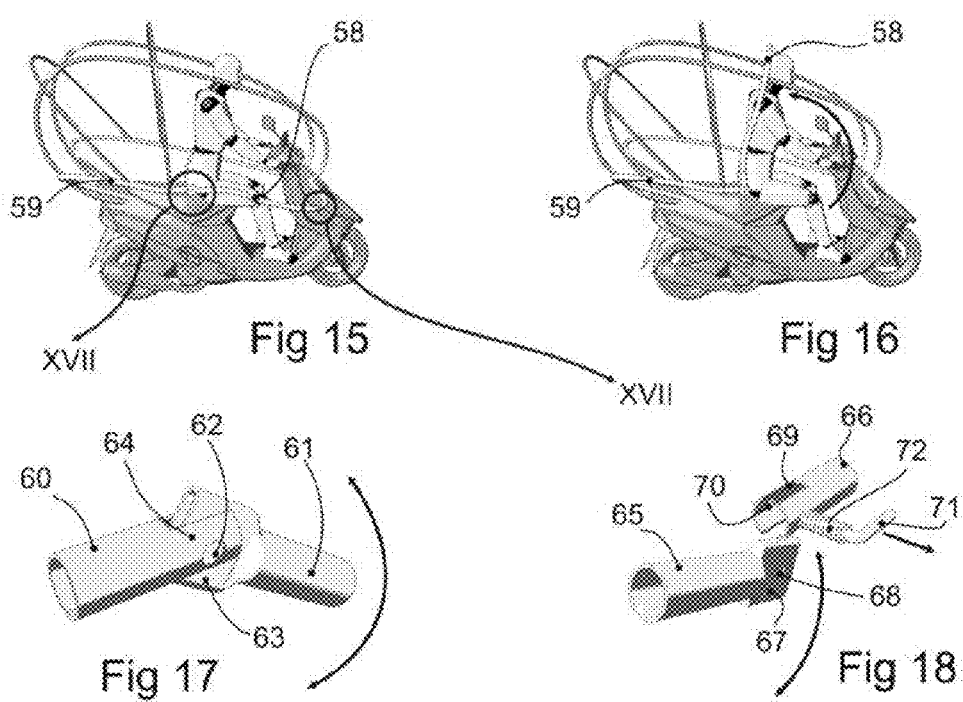
Fig 15
Fig 16
Fig 17
Fig 18

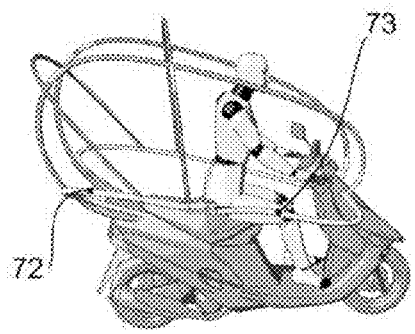
Fig 20
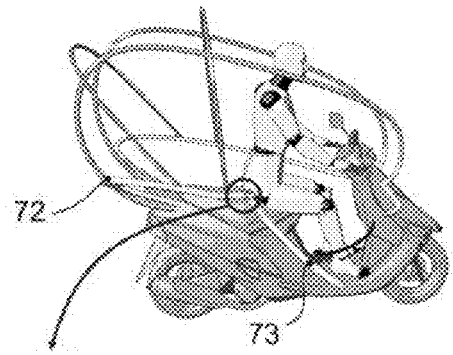
Fig 19
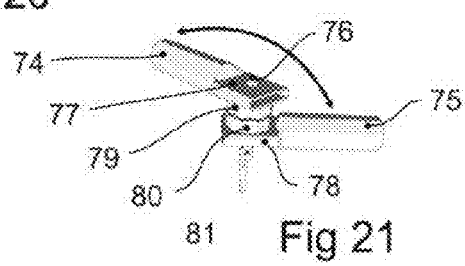
Fig 21
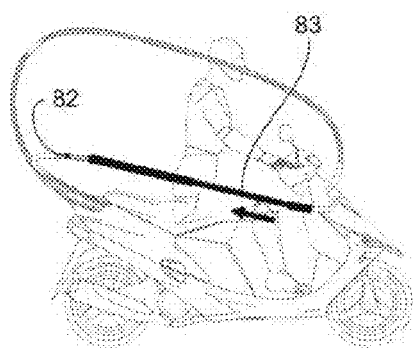
Fig 22
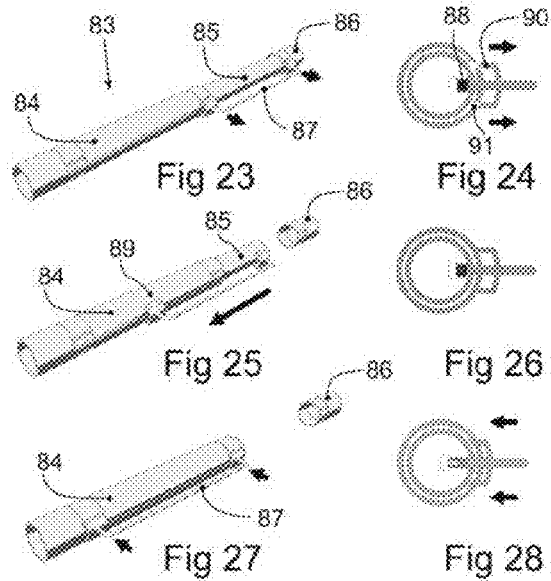
Fig 23  Fig 24
Fig 25  Fig 26
Fig 27  Fig 28

INTEGRAL PROTECTION REMOVABLE SYSTEM FOR MOTOR VEHICLES WITHOUT BODY SHELL

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention is related to the field of protecting devices used in motor vehicles where the life of the passengers is in danger in case of a collision and, more particularly, the invention refers to a new removable protecting cage that shows a configuration which makes it much more practical and modern than any other of its kind, as it is a system of removable and combinable bars which form a modular system, which is capable to resist impacts in all directions, it is also light and aerodynamic, preferably for motorcycles.

When stating motor vehicles without body shell, and even when the present specification aims the application of the invention to motorcycles with two wheels, the present cage applies to every vehicle with no body shell, such as tricycles, four tracks, scooters, etc.

2. Description of Related Art Including Information Disclosed Under 37 CFR 1.97 and 37 CFR 1.98.

Multiple alternatives are known for structural protection for motor vehicles without body shell but none of them is shown as totally removable, consisting of removable and combinable bars, such as the present one. All of them are complex, inefficient as regards design, to support impacts from any direction or hard front impacts, also, most of them are very heavy and show poor aerodynamic features which only produce a higher resistance to the advance, with the consequent increase in the expense of fuel and lower speed.

U.S. Pat. No. 1,473,956 by Eyre, discloses a highly restrictive structure as regards manageability, and too heavy, does not show aerodynamic features or a careful care of design. The straight form of the canopy directly absorbs the impact force in a vehicle crash. This straight form of the structure of "cages" is not appropriate to protect the passengers from abrupt knocks in a possible overturn at high speed.

The structural development of this patent also discloses drawbacks regarding manageability and aerodynamic performance in curves at high speeds since it elevates the gravity center of the structure with no compensation of the weight at both sides, which makes the structure be a danger factor instead of a safety factor in this kind of maneuvers, which would lead to collisions and lateral falls of vehicles, thus entrapping the passengers in the structure, which would unavoidably suffer a lateral friction. The longitudinal bars of the structure are parallel and do not provide a strong design and the structure shows a transversal bar consisting of two straight segments, which do not either provide a strong design having aerodynamic advantages.

U.S. Pat. No. 2,783,056 by K. A. Belk discloses a protecting structure for tractors, with such a form that it exposes the laterals of the passengers, and without a concept of removable installation. It is not thought to be used in motorcycles and the like.

U.S. Pat. No. 3,284,130 by V. E. Michael combines a rain shield con un escudo frontal for wind, and its main function is to protect the passengers from inclemency of the weather, therefore its top structure would not provide integral safety in case of collisions and/or accidents, not mentioning that the structure itself leaves the laterals unprotected and it is not coincident with a modular structure with removable perimeter protecting bars.

U.S. Pat. No. 3,561,785 by Kidder discloses a protecting structure for vehicles, with such a form that it exposes the laterals of the passengers, and without a concept of removable installation. It is not thought to be used in motorcycles and the like.

U.S. Pat. No. 4,313,517 by Pivar discloses a vehicle similar to a motorcycle and/or motor tricycle with a body shell-type structure consisting of metallic bars. Even though it could be described as a perimeter safety grille, said body shell does not show a convenient aerodynamic form to break up and temper the caused knocks; as well as it does not show noticeable aerodynamic qualities. The patent differs from the one described herein mainly because it does not mention a removable safety bar kit.

U.S. Pat. No. 4,327,931 by Winiecki refers not to a cage but to a body shell which is mounted on a particular structure having a seat and cabin, not being applicable as a safety structure attached to a motor vehicle without body shell. Besides, it does not cover the whole driver's perimeter as it leaves unprotected his head.

U.S. Pat. No. 4,412,595 by Kinzel proposes a casing or shell which emphasizes a transverse bar in the middle of the vehicle, without completing any configuration with longitudinal bars. This shell is partial and only covers the back half of a driver, leaving all his front and lateral unprotected, being unsuitable to cover a big number of traffic front and overturn accidents. The proposed structure leaves, in fact, unprotected, a possible co-driver, fundamental and necessary function in using most of vehicles that might be proposed to be assured today. It is, in fact, a safety structure projected for a particular vehicle and not for standard models that would need a removable protecting cage.

U.S. Pat. No. 4,416,465 by Winiecki discloses a protection which does not protect the head of the pilot and discloses too rigid and straight structural conditions, leaving unprotected sharp edges that, instead of protecting the passengers and pedestrians, proposes serious risks and dangers due to cuts and crashes. This is a heavy structure and with no aerodynamic conditions.

U.S. Pat. No. 4,560,196 by Carter discloses a protection designed specifically to protect the passengers from weather inclemency and the elements without being protective.

U.S. Pat. No. 4,673,190 by Ahlberg proposes two bars at a low height thus forming a structural system that leaves exposed and completely out of protection practically all the body of the passenger and a possible co-passenger. The lateral and transverse bars are rectilinear thus losing the aerodynamic advantages and are not suitable to dissipate the strength of a front crash as well as this structure would not benefit a collision at high speeds and also a downturn.

U.S. Pat. No. 4,778,214 by Chuen-Fong proposes a superior structure which applies on a scooter, which is rectilinear and mainly defined as a protection against adverse climatic factors. It does not show safety qualities and is not designed to fulfill said functions. It does not show favorable aerodynamic qualities to be used and leaves the sides of the driver and the co-driver completely uncovered. In general, the patent herein is totally different from a modular structure with removable perimeter protecting bars.

U.S. Pat. No. 4,798,399 by Cameron discloses a integral protection structure, but its structure does not consist of a plurality of surrounding bars but of a determined structure that does not show suitable aerodynamic conditions and does not have the characteristic of being removable, thus generating a cage that is too heavy and not very practical to be used.

U.S. Pat. No. 4,813,706 by Kincheloe discloses a structure that leaves unprotected both laterals of the driver and co-driver and, even though it seems oval shaped from one side, it is not volumetrically, thus being unsuitable both for motorcycles and for tricycles. It consists of two orbital bars which are developed in parallel and vertical orientation, generating a reduced protection perimeter. The structural development also discloses drawbacks regarding manageability and aerodynamic performance in curves at high speeds since it elevates the gravity center of the structure with no compensation of the weight at both sides, which makes the structure to be a danger factor instead of a safety factor in this kind of maneuvers, which would lead to collisions and lateral falls of vehicles, thus trapping the passengers inside which would unavoidably suffer a lateral friction. The straight form of the pipes directly absorbs the impact force of a lateral vehicle crash and this rectilinear form of the structure is not appropriate to preserve the passengers from hard knocks in a possible downturn at high speeds. It is also noticeable, in the design by Kinechloe, that the turn is restricted at the front wheels due to the bars of the structure themselves.

U.S. Pat. No. 4,973,082 by Kincheloe discloses a protective structural cage that shows a substantially ovoid form in its lateral description but which leaves in a planar relationship the superior and the inferior bars, this way eliminating the protection advantages in case of a fall or downturn, which would be provided by a substantially ovoid form in all its directions to an integral protective cage for motorcycles. The present structure leaves uncovered and with no protection the laterals of the passenger, and does not have the possibility to protect a second co-driver in the vehicle. Lastly, we should indicate that this integral protection cage does not contain surrounding orbital bars and that, mainly, does not show removable or detachable conditions, but it is formed by a cage integrated to the chassis of the vehicle, thus resulting in a structure with ergonomic functions which are unpractical and difficult to implement in varied vehicles.

U.S. Pat. No. 5,257,671 by Watkins discloses a conventional cage structure with lateral support means and which shows rectilinear bars and right angles at the corners, showing danger for cuts to pedestrians against the sharp edges in case of collision. It shows a poor aerodynamic performance at the same time that it is not conceived to provide the necessary and sufficient space that a driver and a passenger should have in a vehicle of this kind This invention is not conceived for such vehicles as motorcycles and the like. It does not show removable characteristics.

U.S. Pat. No. 5,458,390 by Gilbert discloses a structure for motorcycles and the like which is formed with a modular system of bars and surfaces that cover the perimeter until they cover the whole vehicle. It has functions more related with the protection against a bad climate such as rain and others, instead of being a safety structure consisting of removable bars extending from a front part of the vehicle to the back part thereof.

U.S. Pat. No. 5,503,430 by Mikietal discloses a conventional anti-downturn bar for vehicles and particularly for quad bikes. The straight form of the bars that shows the structure loses aerodynamic advantages and is not suitable to dissipate the strength of a front impact.

U.S. Pat. No. 5,685,388 by Bothwell discloses an integral coating structure for a passenger of a motorcycle and for his vehicle. It is rough, complex achieve a good manageability and heavy. It does not have the features of a system of light surrounding safety removable bars, which are ergonomic and easy to install.

U.S. Pat. No. 5,743,561 by Kim discloses a structural development of anti-downturn, non-anti-crash vertical bar, which leaves both laterals of the driver and co-driver free and also discloses two elliptical bars which are developed parallel and vertical, thus generating a reduced protection perimeter. The structural development of this protection also discloses drawbacks regarding manageability and aerodynamic performance in curves at high speeds since it elevates the gravity center of the structure with no compensation of the weight at both sides, which makes the structure to be more a factor of danger than a factor of safety in this type of maneuvers, which would lead to collisions and lateral falls al the vehicles, trapping its occupants in the structure who would unavoidably suffer a lateral friction. The straight form of the pipes directly absorbs de impact force from a lateral car crash. This rectilinear form of the structure is not appropriate protect the passengers from hard knocks in a possible downturn at high speeds.

U.S. Pat. No. 5,791,718 by Boutin discloses a structure tubular with rods that support a complete cover, designed to protect the passengers from adverse climates. The structure is not designed as a removable safety structure with surrounding bars for lateral protection of the passengers.

U.S. Pat. No. 5,904,392 by Mainwal proposes a rigid shield to provide surrounding safety to drivers of motorcycles and the like. It protects the passengers in case of bad climate and offers certain surrounding safety conditions, but contemplating its purpose of providing safety, it is observed that it leaves the laterals of the driver completely unprotected. Due to the rigid nature of the invention the same lacks modular characteristics, does not show removable characteristics through connecting modules so that its assembly and disassembly is practical and fast. It is not, however, a system of removable bars.

U.S. Pat. No. 6,010,173 by Chyan-Luen discloses an external structure for motor vehicles without body shell as a shield against the sun and adverse weather conditions. It discloses a removable covering canopy, but as regards its structure it is shown to be excessively big and, consequently, heavy. Due to the rigid structure of the invention the same lacks modular characteristics, either adaptable and/or extendable, not being able to modify its size and shape in order to achieve convenient proportions when being stored, or it has capacities to modify its position as regards the vehicle. It does not show removable characteristics, does not focus its use in different models of vehicles, and it is not, finally, a system of removable bars for surrounding protection of passengers of vehicles without body shell.

U.S. Pat. No. 6,142,153 by Mueller, Helmut, Rainer and Markus, discloses a protecting structure substantially ovoidal that leaves unprotected the laterals of the driver, does not include the co-driver in the perimeter of protection and, mainly, consists of a single structural protection piece which forms the chassis, without essentially being a removable bar annexed protection system.

U.S. Pat. No. 6,325,441 by Ugolini discloses a body shell for a scooter type vehicle or the like which functions as a protective roof in case of bad weather and relative surrounding safety conditions. It discloses removable characteristics by means of a system which relates it directly with the Scooter type models, with two portions of the body shell at the laterals of the passenger. However these sections are linked to the general body shell and not with the vehicle, making it not suitable to be used in a combined and removable form as a lateral protection, but appealing to an integral cabin installation, which it is not coincident with a system of removable safety bars which are connected from the back part of the vehicle to the front part thereof.

U.S. Pat. No. 6,402,220 by Allen discloses a removable roof for vehicles without body shell such as quad bikes formed by two lateral arc-type bars and superior transverse bars, to which a superior roof is attached. The same does not show qualities or characteristics of a safety system formed by removable bars.

U.S. Pat. No. 6,598,927 by Kurohori, Ozeki, Furuta, Kobayashi, Takamoto, discloses a protecting structure with a substantially ovoid form which leaves the laterals of the driver unprotected, does not include the co-driver within the protective perimeter and, mainly, consists of a single protective structural piece which is part of the chassis, not being essentially an attached protective system with removable bars.

U.S. Pat. No. 6,764,099 by Akiyama discloses a structure for impact absorption for vehicles which is definitely an extension of the vehicle chassis; it is not removable, and specifically designed for a model of vehicle which is totally different from the concept of the removable modular structural system. The described patent protects mainly the passenger from front knocks leaving the laterals unprotected.

U.S. Pat. No. 7,175,200 by Obershan discloses a protective cage for motorcycles which does not have the characteristics of a removable integral system annexed to the vehicle, but also being a single structure that shows very scarcely specified technical developments, thick, rough and heavy structures, does not show possible aerodynamic conditions or an ergonomic development suitable to allow for entering of the passengers to the vehicle. The theoretical and conceptual development of the above mentioned patent claims characteristics that have been claimed before by all prior patents, but without offering new techniques of resolution, or improvements in the field of functionality.

US patent publication 2010/0096200 A1 by Bombarda discloses a three-wheel particular vehicle with an external body shell which leaves open spaces at the sides of the driver seat. Even though it refers to a structure providing safety and/or coverage of the passengers, it leaves the passenger sides unprotected; it is not easily removable and, ultimately, is not a system of removable safety surrounding bars.

The patent DE 3431406 is based on a lateral protection bar which does not totally cover the passenger of the vehicle and his co-driver. It does not play the role of a removable safety integral structure.

The patent DE 4222253 A1 refers to a motor vehicle with two wheels which proposes three embodiments; all with different safety structural complements. The model disclosed in FIG. 1 refers to a safety "Door" or "Arm", which protects the passenger at both sides of the vehicle. This protection form does not cover the integral safety perimeter of the driver, leaving the co-driver completely uncovered. The pivoting function of these "Doors" are directly connected to the chassis of the vehicle and therefore are different from the "pivoting stretch" of the safety bar disclosed in claim 5 of the patent defined in the above mentioned prior art.

The model defined in FIG. 2 discloses an intermediate vehicle between a motorcycle and a car, which complementary wheels and two lateral doors, which claims a structure that mainly differs from the protecting surrounding structure consisting of removable bars.

Also, the model disclosed in FIG. 3 refers to a vehicle which more than two wheels and one complete structural chassis, with no contact points with the invention disclosed in the present art.

The patent DE 19505448 A1 is similar to the above mentioned U.S. Pat. No. 6,142,153, and particularly describes a fastening system or "Belt" which fasts the driver to the structure of the vehicle from the waist and the shoulders, firmly fastening to the structural chassis of the vehicle under the seat and against the back appearing in this model. The function of a safety "Belt" or "Harness" which keeps the driver fixed to a motor vehicle has contact points with claim 7 which is defined in the present Art, except that the patent herein defines an "Harness" which totally surrounds the waist of the driver and/or the co-driver and skirts their shoulders, both at the front and at the back, being firmly fastened to the superior perimeter safety bars, playing the safety roles with different techniques and resolution forms.

The patent DE 19629879 A1 is similar to the above mentioned U.S. Pat. No. 6,142,153 which was described above.

The patent EP 0 820 924 A2 is similar to the patent DE 19629879 A1 and the above mentioned U.S. Pat. No. 6,142,153 which was described above.

The patent DE 20 2007 002 826 U1 discloses an integral cabin for bikes which provides structural protection, with a design that prioritizes the protection against weather and/or rain instead of in case of impacts at high speeds. Is not designed as a bar system and does not show removable characteristics.

The patent DE 202018012695 U1 discloses an integral vehicle with three wheels and two seats, with a main structure. The development is not equivalent with a modular removable bar system.

The patent 2 335 821 of Patent and Trademark Spanish Office, by Patrick Tonnelier discloses a device of modular coverage for motorcycles and the like. The cabin is formed by a sliding continuous panel set and, even though it plays the role of providing structural safety, is not designed as a system of removable and modular bars.

The patent 2 649 064 of the National Institute of Industrial Property of Paris, by Sovanna, discloses an integral vehicle with an outer body shell which forms an integral safety structure for the passengers of the vehicle. Even though it plays the roles of providing protection against accidents it does not refer to a cage-like system formed by removable bars, but it refers to a particular structure like a body shell with a pivoting opening.

The international publication WO2006049079 A1 by Yoshimasa discloses a vehicle particular with three wheels with a body shell with doors which completely covers the perimeter of the driver. Even though it refers to a structure which provides safety and/or coverage to the passengers, it is not easily removable and, ultimately, it is not a system of removable safety bar system.

The international publication WO 2007/129193 A1 by Tonnelier has been mentioned above with the registering of Patent 2 649 064 of the National Institute of Industrial Property of Paris.

The international publication WO 2008/012624 A2 discloses a superior structure for bikes which provides structural safety along with lateral structural variables, which by having rectilinear form do not have the capacity to correctly protect in case of crashes, downturns and/or lateral falls, and specially, they do not show removable characteristics. It does not show an appropriate resistance to be installed in motorcycles as it is finally a basic protection system for bikes.

The patent CZ 2264 U1 filed in Czech Republic discloses a bar structure which is placed to the sides of a motorcycle model to be erected in a rotating way and form a support structure for a canopy. It refers to a structure which is proposed to generate a roof for protection against adverse weather conditions such as rain, snow, etc. and it is not about a removable integral safety structure.

A search of the internet yields examples of canopy models produced by such companies as BMW, Piaggio, Benelli, Renault, Jonway and Velotop. Additionally, prototypes are found in the science fiction area as well.

For the above, the technique of the field of the invention for "safety cages or structures for motorcycles and the like" is widely developed, with different models and proposals that, due to different reasons convenient for the development of the global vehicular traffic, today in 2011, we start to foresee even with the perspective to achieve a wide development.

Some of the above mentioned patents refer to designs with wide qualities from the ergonomic and functional points of view, but they are not coincident with the inventive search for protection cages or surrounding safety structures formed by a system of bars annexed to and removable from the vehicle module.

Therefore and by virtue of the current state of art, the creation of a safety removable system which is comfortable and practical is very appropriate, which contributes to turn these type of light vehicles into main transport options any time and in all the big cities all around the world, this way contributing to urban clearing and healthier traffic, also promoting the saving of energy and consumption of fuel by encouraging the use of vehicles more ergonomic and sustainable than cars.

BRIEF SUMMARY OF THE INVENTION

It is therefore an object of the present invention to provide a new integral protection removable system for motor vehicles without a body shell, which comprises a plurality of longitudinal bars, also called orbital, and transversal bars, which cover the sides below and above the height of the seat of the vehicle and which define, as a whole, a substantially ovoid configuration having its spherical end directed to the back of the vehicle and its oval end directed to the front part of the vehicle, such that it guarantees a high resistance to all kind of impacts.

It is another object of the present invention to provide an integral protection removable system for motor vehicles without body shell, of the type which comprises a plurality of bars which contain the vehicle and its driver in order to protect him in the event of a collision or downturn, wherein the cage comprises: at least a first pair of longitudinal tubular, light bars, each one disposed at each side of the vehicle and having a lower edge disposed at a height preferably between the seat of the vehicle and the ground; at least a second pair of longitudinal tubular, light bars, each one disposed at each side of the vehicle and at a height above the seat of the vehicle; at least a transversal bar which extends from one to another side of the vehicle and at least above said seat; wherein said first and second pairs of bars longitudinally extend from the back part of the chassis of the vehicle to the front part of the chassis of the vehicle defining, along with said transversal bar, a substantially ovoid configuration, said ovoid configuration showing its aspheric end directed to the back of the vehicle while its oval end is directed to the front part of the vehicle, being these bars connected to said chassis by means of removable fastenings.

It is also another object of the present invention to provide an integral protection removable system for motor vehicles without a body shell which comprises a structure integral of safety which is removably fixed to the chassis of said vehicle in the specific way and in agreement with different models of vehicles, that shows aerodynamic structural characteristics and high capacity of absorption of impact forces, showing an ovoid, ovoid or oval configuration, including elliptical, orbital, longitudinal bars in different angles with respect to the axis of the main body shell, fastened to the main chassis, and which may incorporate fixed or removable annexed coating panels, to increase the safety and protection measures, also including safety belts which work in combination with the structure, being the set applicable to motorcycles, motorbikes, motor tricycles, quad bikes and the like.

BRIEF DESCRIPTION OF THE SEVERAL VIEWS OF THE DRAWINGS

For a better clarity and understanding of the object of the present invention, the same has been illustrated in several figures, in which the invention has been represented in one of the preferred embodiments, only as example, in which:

FIG. 14 is a detailed view of the back fixing nucleus of FIG. 13;

FIG. 15 is an elevational side view of a scooter-type motorcycle that show inside a magnifying glass the joint and the fastening means of a stretch of a pivoting bar to allow for the entering of the driver to the interior of the cage, being this stretch of bar in a closed position;

FIG. 16 is an elevational side view of the scooter of FIG. 15, with the stretch of bar in an open position;

FIG. 17 is a perspective view of the joint means of the stretch of bar of FIG. 15;

FIG. 18 is a perspective view of the fastening means of the stretch of bar of FIG. 15;

FIG. 19 is an elevational side view of a scooter-type motorcycle which indicates, in a magnifying glass circle, the joint of a stretch of a pivoting bar to allow for the entering of the driver to the interior of the cage, being this stretch of bar in an open position;

FIG. 20 is an elevational side view of the scooter of FIG. 19, with the stretch of bar in a closed position;

FIG. 21 is a perspective view of the joint means of the stretch of bar of FIG. 19;

FIG. 22 is an elevational side view of a scooter-type motorcycle which shows a stretch of telescopic sliding bar to allow for the entering of the driver to the interior of the cage, being this stretch of bar in a closed position;

FIGS. 23, 25 and 27 are perspective views of the telescopic and sliding assembly of the stretch of the orbital bar of the cage, in three operating positions;

FIGS. 24, 26 and 28 are cross-sectional views of the telescopic and sliding assembly in the three operating positions of the corresponding FIGS. 23, 25 and 27;

DETAILED DESCRIPTION OF THE INVENTION

Figure 1:
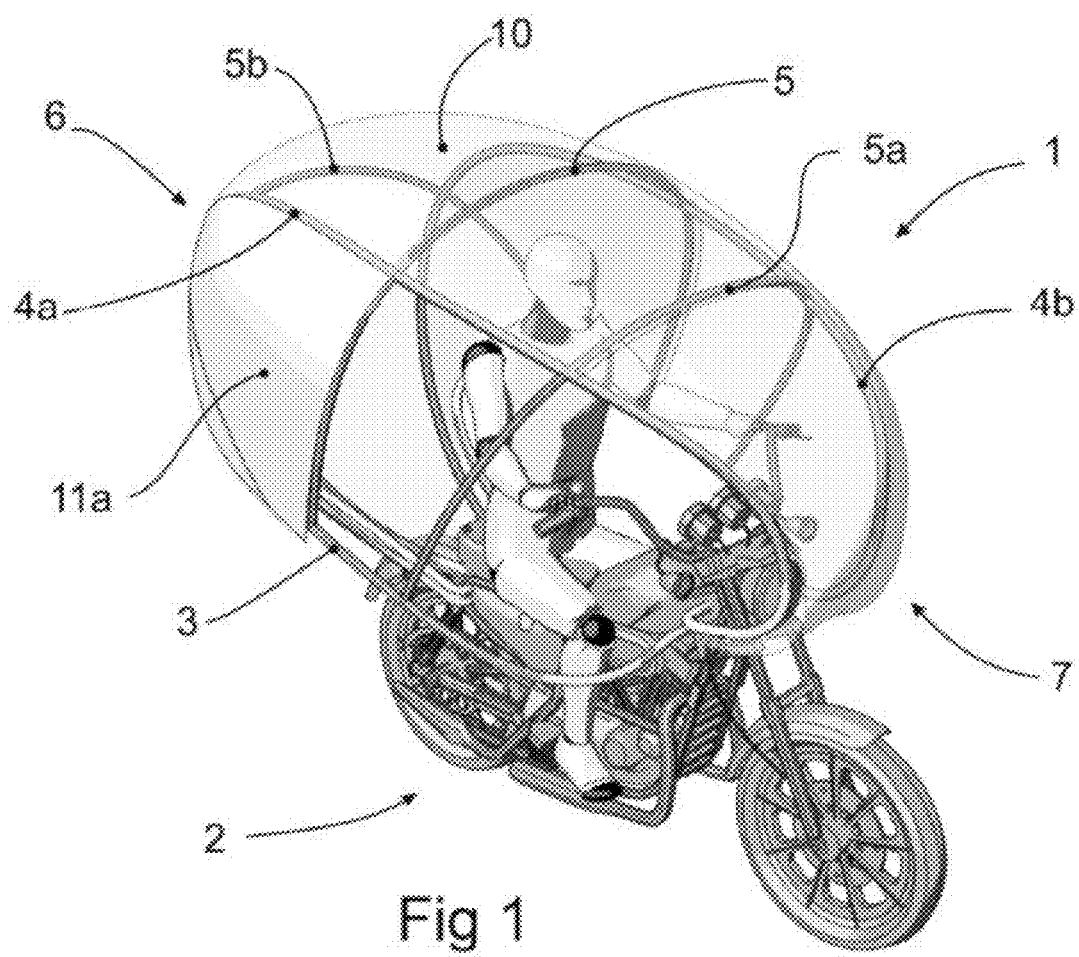
FIG. 1 is a perspective view of a motorcycle which has the cage installed in agreement with one embodiment of the invention.
Figure 2:
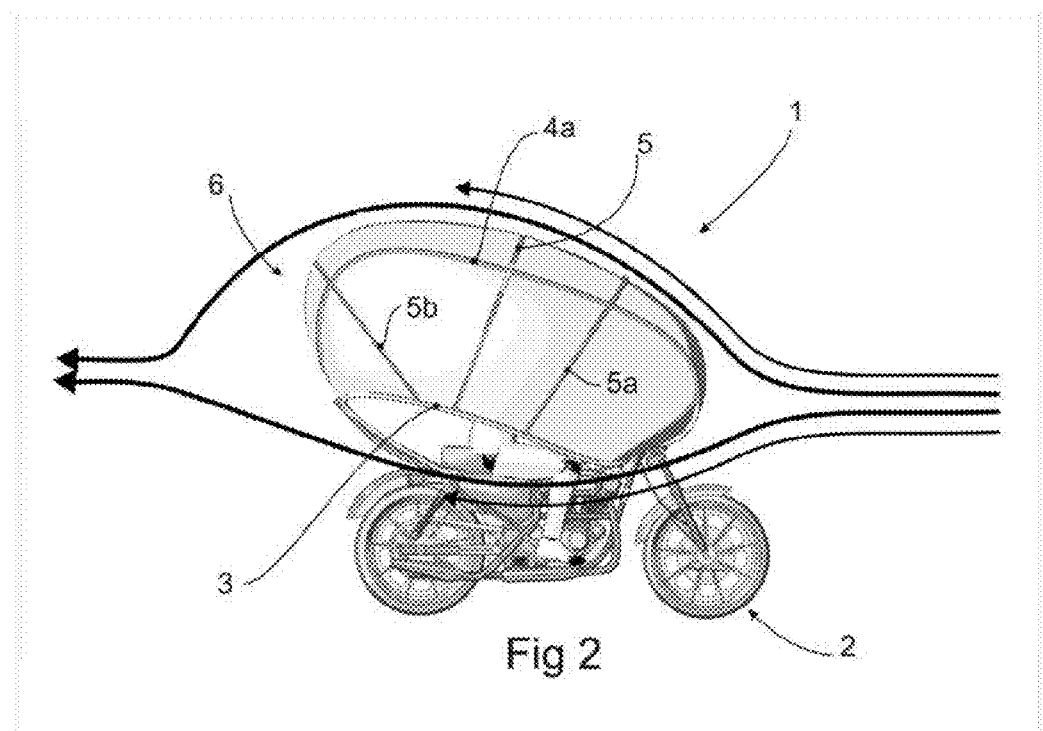
FIG. 2 shows an elevational side view of the motorbike of FIG. 1 facing an air flow in a wind tunnel.
Figure 3:
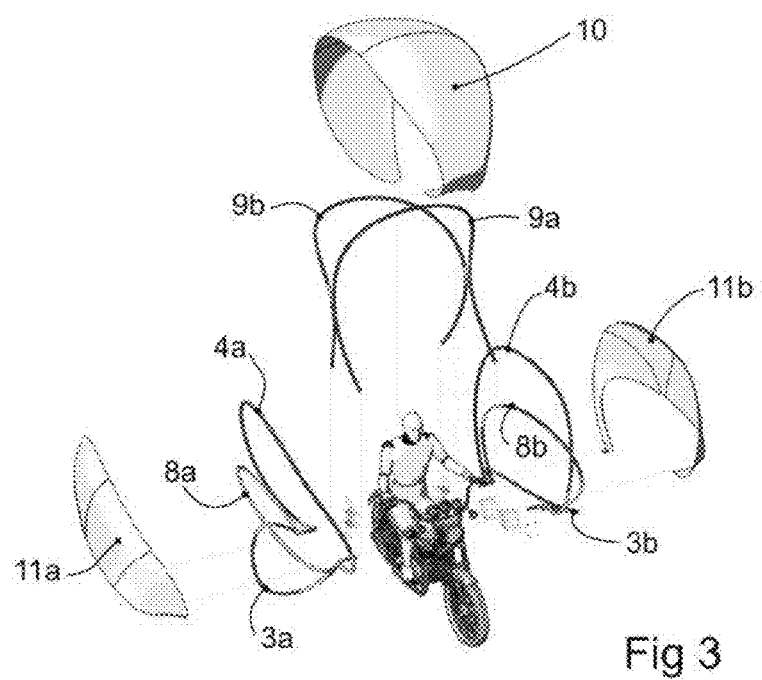
FIG. 3 is an exploded view of a motorcycle with the cage in agreement with another embodiment of the invention.

Referring now to figures we see that the invention refers to a novel integral protection removable system for motor vehicles without body shell, such as for example motorcycles, tricycles, quad bikes, etc. As shown in FIGS. 1 to 3, which show one of several embodiments of the invention, the cage, indicated with general reference number 1, comprises a plurality of bars which contain the vehicle 2 and its driver in order to protect him in the event of a collision or downturn. In agreement with the invention, the cage 1 comprises at least a first pair of longitudinal tubular and light bars 3a and 3b, also called orbital bars, of which only the left bar is shown in FIGS. 1 and 2, each one disposed at each side of the vehicle and which lower edge is not higher than the seat and is preferably disposed between the seat of the vehicle and the ground. The cage also comprises at least a second pair of longitudinal tubular, light bars 4a and 4b, also called orbital bars, each one disposed at each side of the vehicle and at a height above the seat of the vehicle. The cage is completed with at least a transversal bar 5 which extends from one to another side of the vehicle and at least above said seat and cross-linked with the longitudinal bars such that, at the cross-linking points, the bars are fixed to each other either by welding or by staples or clams and bolts. In the embodiment of FIGS. 1 and 2, three transversal bars are illustrated, 5, 5a and 5b.

In agreement with the invention, said first 3 and second 4 pairs of bars longitudinally extend from the back part of the chassis of the vehicle to the front part of the chassis of the vehicle and define, along with said transversal bar 5, a configuration which is substantially ovoid, ovoid or oval, and which is disposed such that the bigger end, that is, the aspheric end 6 of the ovoid is directed to the back of the vehicle while its oval end 7, that is, the one of smaller size, is directed to the front part of the vehicle. Said ovoid configuration shows its longitudinal axis matching the longitudinal geometrical axis of the vehicle and preferably, even though not necessarily, is slightly sloping downwards to the front of the vehicle.

The cage of the invention discloses a specific ovoid geometrical configuration providing high resistance to the impacts and low aerodynamic resistance, being it suitable for collisions, by reducing the knock force by means of a decomposition of the collision forces. This aerodynamic form shown by the cage also helps generating more aero dynamism in the vehicle, turning the cage into a weight annexed to the vehicle which will not excessively restrict the capacities of the motor and the performance of the vehicle or its acceleration and speed, RPM, nor its manageability. This new cage is suitable for the current traffic safety market, with variable designs, forms and sizes which are adapted, with the same concept, to all models of motorcycles, motorbikes, motor tricycles and any kind of motor vehicles without body shell. The "ovoid" or "cranial" form may be obtained with the configuration of four orbital bars and one transversal one as illustrated in FIG. 1, however other bars may be added such as for example, the orbital bars 8a and 8b and the two transversal bars 9a and 9b are shown in the embodiment of FIG. 3, completing the general circumference and all the perimeters needed to provide complete safety to the passengers. All the bars may be made of light and resistant materials, preferably metallic and may include protective coatings. The materials required by the cage will be different and varied, depending of the structural model, being them made of iron, aluminum, and different types of metals. The cage may also use other materials such as wood, carbon, plastic, and different synthetic materials and, finally, any material which is strong enough to resist considerable crashes.

As it can be seen in FIGS. 1 to 6, the cage may have closing panels fixed to the bars. For example, one or more panels 10 may be provided as a roof, and lateral panels 11a and 11b which could be fixed, preferably in a removable way, also in a sliding way, to the orbital and transversal bars as shown below.

Figure 4:
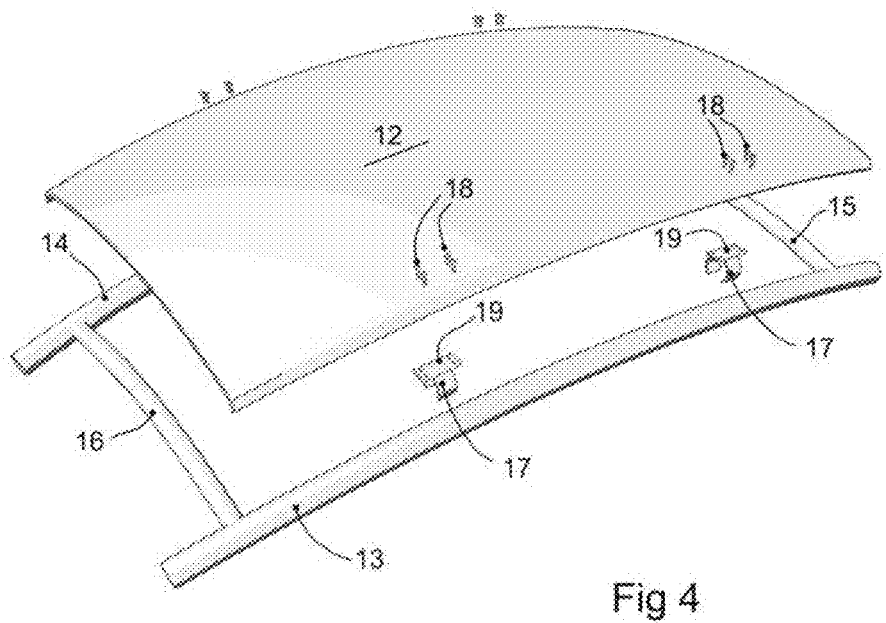
FIG. 4 is a perspective view of a removable panel of the cage of the invention.

As shown in FIG. 4, a panel 12 may be fixedly mounted between two orbital bars 13 and 14, and/or transversal bars 15 and 16, as a way of illustration, by means of any type of staples or elastic fastenings such as staples in a "C" form 17 which may be fixed to the panel by means of screws 18 which are subject to amounting plate 19 of the staples. As shown the staples 17 allow for an assembly of elastic fit sufficient to hold el panel in the cage but allowing for its removal with no need to use special tools.

Figure 5:
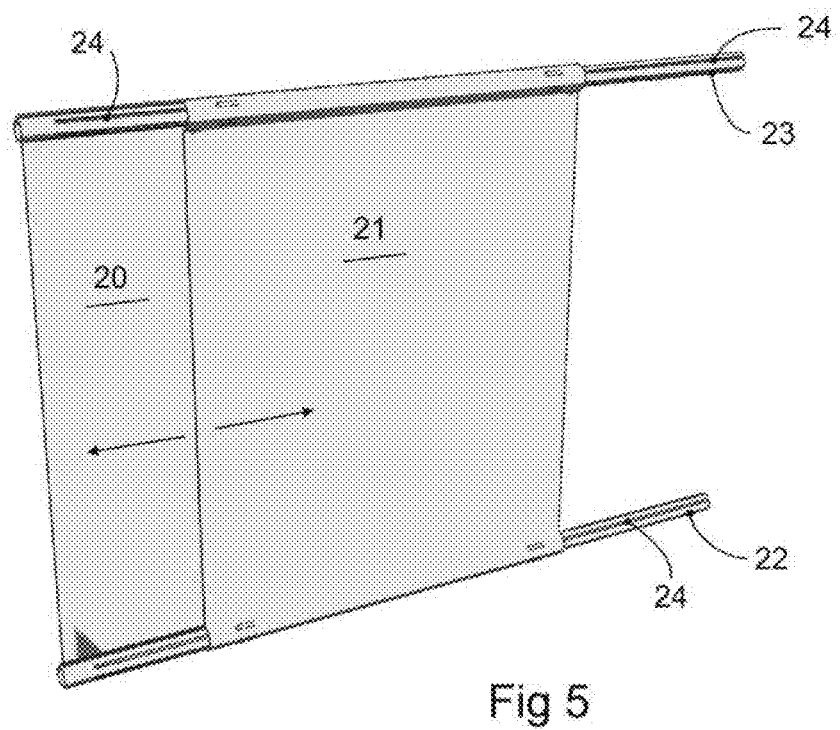
FIG. 5 is a perspective view of a sliding panel of the cage of the invention.
Figure 6:
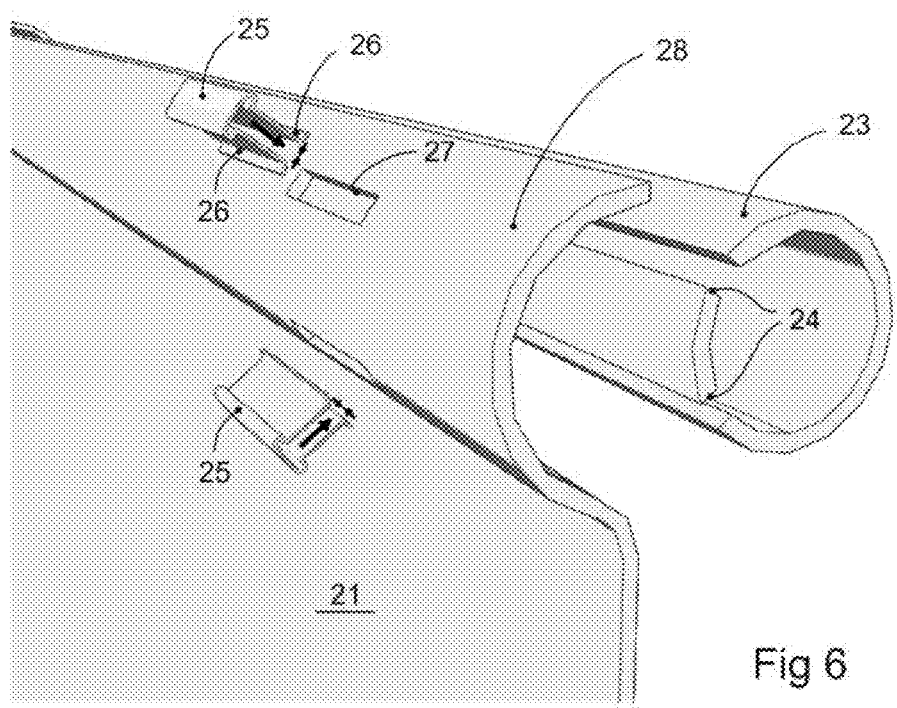
FIG. 6 is a perspective and detailed view which shows los the fastening and sliding means of the sliding panel of FIG. 5.

FIGS. 5 and 6 illustrate an alternative of panels which show an assembly of two sliding panels between them 20 and 21, mounted on two bars 22 and 23. One of the panels, for example panel 20 may be fixed between the bars while the other panel slides on the bars. One way to carry out this assembly is by means of slots 24 on the bars 22 and 23 inside which elastic staples 25 are sliced. The staples 25 may be metallic or made of resistant plastic materials and generally have a "U" shape with flanges 26 at their ends. For placement, they are compressed so that their flanges 26 tend to move into the center, they are inserted inside holes 27 provided on the curved borders 28 of the panel 21, passed through the slots 24 and loosen so that they are fixed inside the and holes, with sliding capacity along the slots.

The panels and coatings may have different designs and shapes of any kind and size, different materials, providing reinforcements in the safety of certain zones of vehicles and the bodies of the passengers. These coatings or panels will play the double role of extra protection to the passengers of the vehicle against certain non-frontal but sharp knocks, impact rebounds, etc. They may be made of such varied and different materials as the ones described for basic structures of the cage and of the chassis of the vehicle itself. They may be made of transparent and/or reinforced materials of varied shapes and sizes, fixed and/or retractile and/or sliding. They may, at the users' discretion, be inserted into or removed from the main structure of the cage thus providing dynamic and design variants to the integral safety system.

The structural pipes, as well as the applicable modular coatings, will be preferably coated with smooth elements which will soften possible knocks, such as high density foam rubber and others, softening possible knocks either at the inner side of the structure, thus safeguarding the passengers of the vehicle, or the external side of the cage, safe warding possible persons and structures that are crashed in collisions, combining safety functions with industrial and aesthetic design criteria which will vary and increase the diversity of different models and shapes of cage.

The orbital or longitudinal bars, whichever their number would be, will be firmly connected to the chassis of the vehicle by means of removable fastenings. In order to describe at least one embodiment, as seen in FIGS. 7 and 8, the cage will comprise three longitudinal bars at each side, such as the bars 3a, 3b, 4a, 4b, 8a and 8b which front ends 31a, 31b, 32a, 32b, 33a and 33b are fixed, preferably, in an easily disassembling manner, to a front fixing nucleus 29 mounted on the front structure of the chassis of the vehicle, fixed, for example, to the front fork 30 of the chassis.

Figure 7:
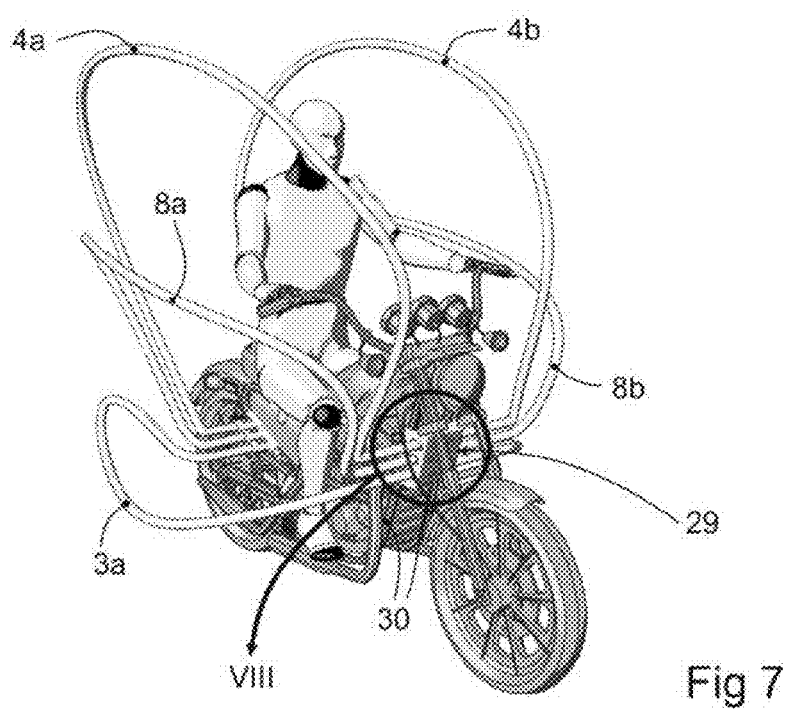
FIG. 7 is a perspective view of a motorcycle which has the cage installed in agreement with another embodiment of the invention wherein the front fixing nucleus is included in a magnifying glass-type circle for orbital or longitudinal bars.
Figure 8:
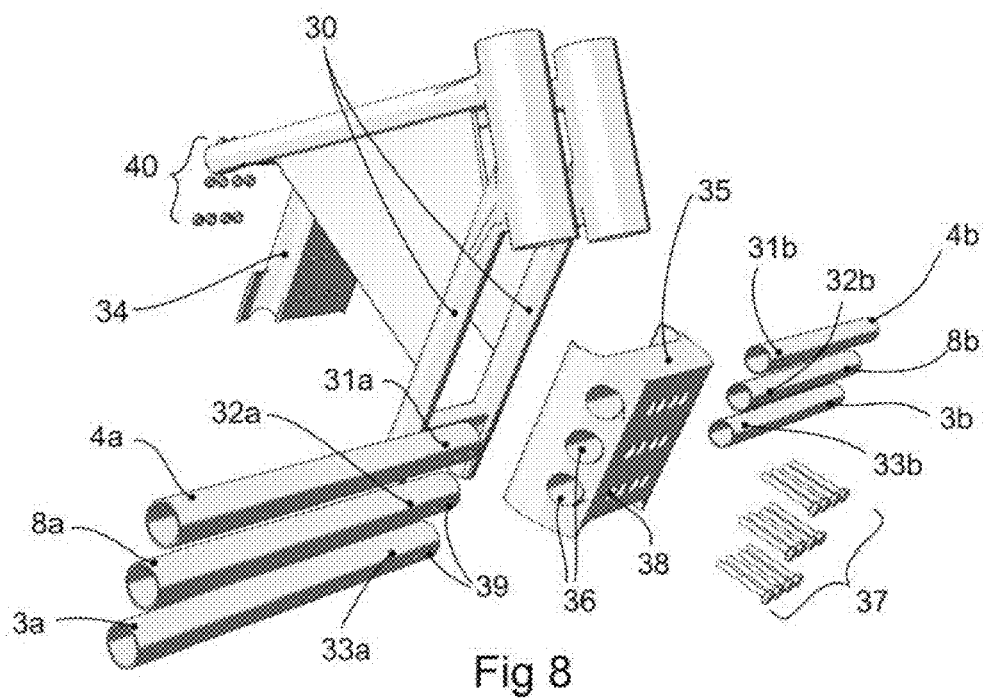
FIG. 8 is a detailed and exploded view of the front fixing nucleus of FIG. 7.

As better illustrated in FIG. 8, the front fixing nucleus 29, contained within the circle VIII, as a magnifying glass, of FIG. 7, comprises a set of back 34, and front 35 clamps or hose clips, which are encircled and rest on the forks 30 and are firmly held thereto with manually operated fixing means and inside which said end 31, 32 and 33 of the bars are retained. In this case, the manually operated fixing means comprise orifices 36 in the front clamp 35, inside which the ends of the bars enter to be afterwards held firmly by screws 37 passing through orifices 38, in the clamp, and orifices 39 at the ends of the bars. This set is fixed with the aid of nuts 40 which are threaded on screws 37 and also hold the back, round clamp 34. This fixing set may be manually disassembled to remove the cage if desired.

Figure 9:
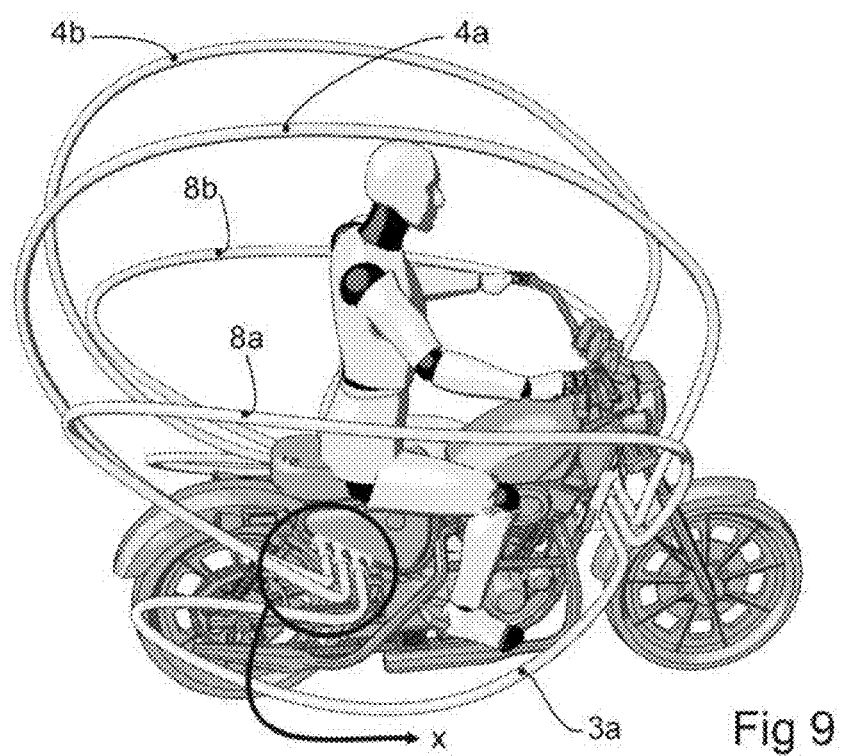
FIG. 9 is a perspective view of a motorcycle which has the cage installed in agreement with another embodiment of the invention wherein the back fixing nucleus is included in a magnifying glass-type circle for orbital or longitudinal bars.
Figure 10:
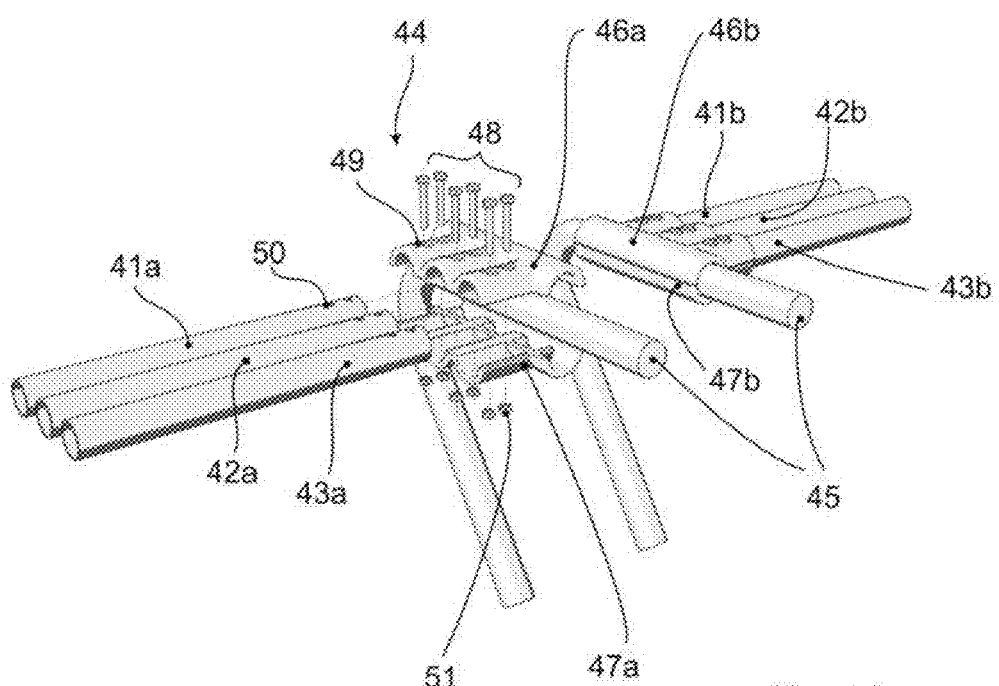
FIG. 10 is a detailed and exploded view of the back fixing nucleus of FIG. 9.

This way at the front part, the orbital or longitudinal bars will have back ends removably fixed to a back fixing nucleus contained in a circle X, as a magnifying glass, of FIG. 9, an illustrated in more detail in FIG. 10. In fact, the bars 3a, 3b, 4a, 4b, 8a and 8b have their back ends 41a, 41b, 42a, 42b, 43a and 43b fixed, preferably in an easily disassembling manner, to a back fixing nucleus 44 mounted on a back part of the structure of the chassis of the vehicle, fixed, for example, to the bars 45 of the chassis, under the seat.

As better seen in FIG. 10, the back fixing nucleus 44 comprises a set of clamps or hose clips, either 46a and 46b, one for each bar 45, or lower 47a and 47b, also for each bar 45, which are encircled and rest on the bars 45 and are firmly held thereto with manually operated fixing means and inside which said back ends are retained 41, 42 and 43 of the orbital bars. In this case, the manually operated fixing means are formed by the semicircular design of said round clamp 46 and 47 in order to receive each end 41, 42 and 43 and hold it by means of screws 48 passing through orifices 49, in the clamp 46, and orifices 50 at the ends of the bars. This set is fixed with the aid of nuts 51 which are threaded over the screws 48 and also hold the lower round clamp 47. In the same way as with the front fixing nucleus, this fixing set may be manually disassembled to remove the cage if desired.

Figure 11:
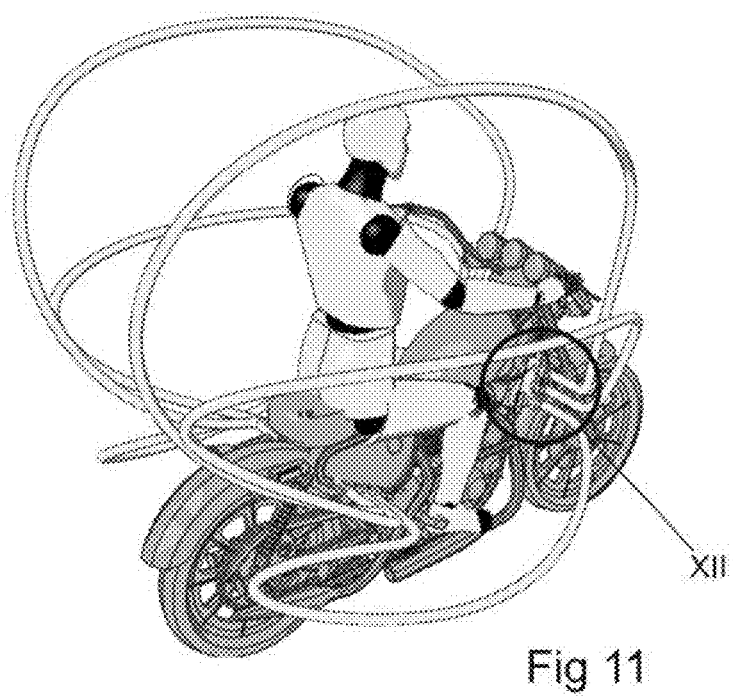
FIG. 11 is a perspective view of a motorcycle which has the cage installed in agreement with another embodiment of the invention wherein an alternative of the front fixing nucleus is included in a magnifying glass-type circle for orbital or longitudinal bars.
Figure 12:
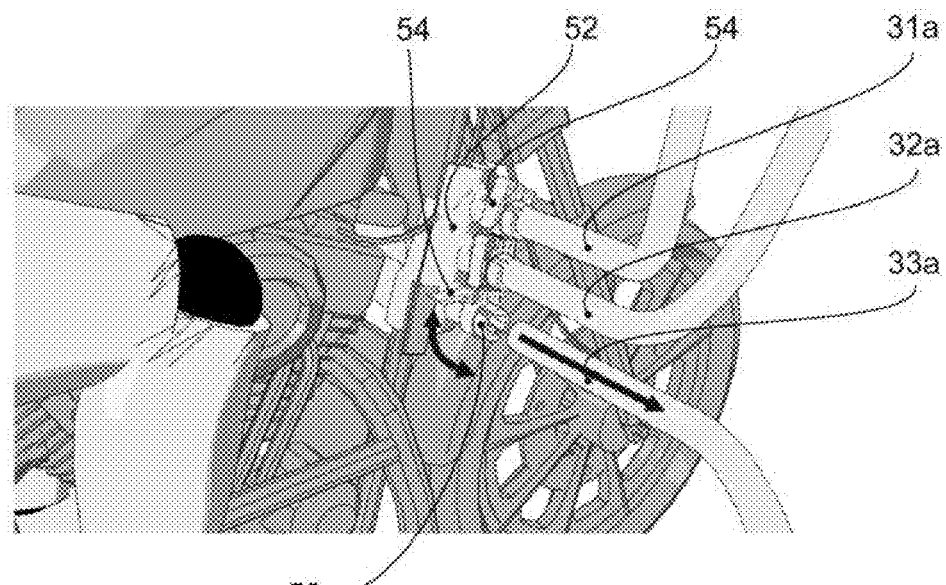
FIG. 12 is a detailed view of the front fixing nucleus of FIG. 11.

FIGS. 11 and 12 illustrate another alternative of front fixing nucleus wherein the nucleus, contained in circle XII as a magnifying glass of FIG. 11, comprises, as better illustrated in FIG. 12, a body 52, fixed to the front part of the chassis, that shows hose clips 53 inside which the ends 31a, 32a and 33a are inserted. The hose clips show a key 54, for example of the type of pivoting cam, which when operated opens or closes the hose clips to release or to retain, respectively, the end of the orbital bar. FIG. 12 illustrated two closed higher hose clips, with their orbital bars held, and one open lower round clamp, with the end 33a of the respective orbital bar going out of la round clamp.

Figure 13:
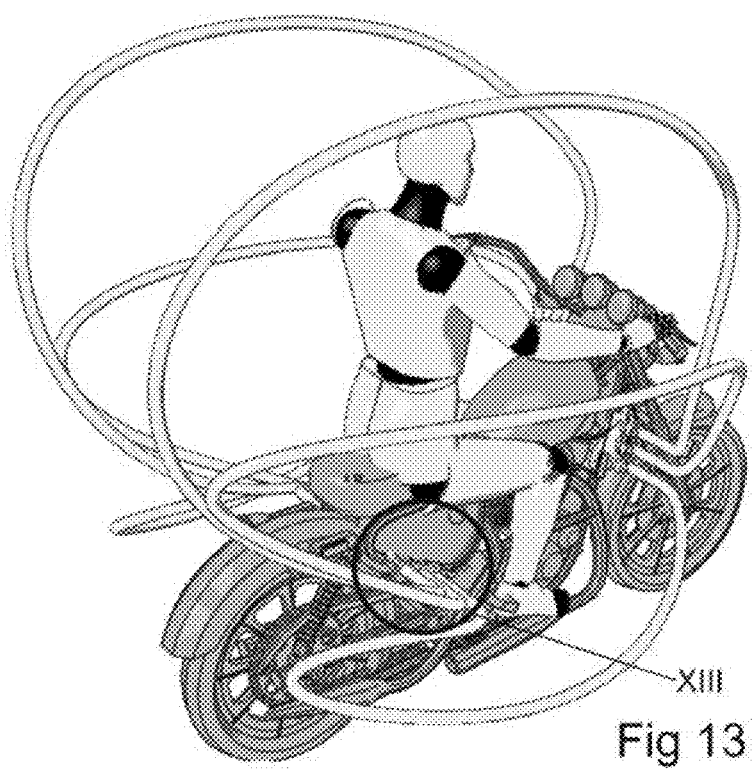
FIG. 13 is a perspective view of a motorcycle which has the cage installed in agreement with another embodiment of the invention wherein an alternative of the back fixing nucleus is included in a magnifying glass-type circle for orbital or longitudinal bars.

In a similar way to the front nucleus, FIGS. 13 and 14 illustrate another alternative of back fixing nucleus wherein the nucleus, contained in circle XIII as a magnifying glass of FIG. 13, comprises, as better illustrated in FIG. 14, a body 55, fixed to the back of the chassis, under the seat, that shows hose clips 56 inside which the ends 41a, 42a and 43a of the orbital bars are inserted. The hose clips show a key 57, for example of the type of pivoting cam, which when operated opens or closes the hose clips to release or to retain, respectively, the end of the orbital bar. FIG. 14 illustrate two closed higher hose clips, with their orbital bars held, and one open lower round clamp, with the end 43a of the respective orbital bar going out of the round clamp.

All assemblies and fixings will be incorporated to the vehicles firmly held on their main chasses, where there are higher advantages from the resistance and the integral force of the set of the vehicle. This will mainly depend on the design and the specific shape of each vehicle model for each case. The fixing will allow the orbital bars to be assembled and disassembled in a fixed and retractile way, individual or structurally to the fixing structure, which in turn will be fixed to the chassis or modularly removable.

In agreement with another aspect of the invention, the cage may have such a design to allow the driver easily entering or exiting the unit, for example leaving the orbital bars to be configured in order to be elevated to the back part of the motorbike without losing protection and resistance capacity. Alternatively, one or more bars may have a sliding or pivoting assembly to open a temporary access to the cage, as seen below.

With the purpose of facilitating the entering of the driver, at least one of the bars is articulated on the cage. For example, FIGS. 15 to 18, show at least one of the longitudinal or orbital bars, indicated with reference number 59, which discloses a pivoting stretch 58 between a closed position which keeps the ovoid configuration, illustrated in FIG. 15, and one open position defining an entering to the interior of said cage, illustrated in FIG. 16. Said stretch 58 discloses an end articulated on the longitudinal bar, indicated inside the circle as a magnifying glass XVII of FIG. 15, and an opposing end which has a manually operated fastening which is connected with the cage to close said entering, indicated inside the circle as a magnifying glass XVIII of FIG. 15.

As illustrated in FIG. 17, the joint of the stretch 58 may be done by means of a simple mechanic resource, such as a hinging match between two tubular portions 60 and 61 which are articulated by means of a pin 62 which passes through a planar part 63 of the tubular portion 61 and one part with the form of fork of portion 60. Portion 60 may be fixed to the bar 59 or, directly, be and end thereof. This way, portion 61 may be fixed to the bar 58o, directly, be and end thereof. FIG. 18 illustrates a mechanic solution for the front fastening of the stretch of bar 58. There, two tubular portions 65 and 66 can be seen, wherein portion 65 has a planar part 67 with an orifice 68, and the tubular portion 66 has the shape of fork 70 with orifices 70. At the fork 69 the planar part 67 is articulated and a rod or pin with lever 71 is disposed which passes through the orifices 70 and orifice 68 to keep portion 65 fixed to portion 66. Being the planar part 67 engaged inside the fork 69 by means of the pin 71, the bar 59 maintains the structural resistance of the cage and when access to the cage is wanted, the pin 71 is moved outwardly to release portion 65 and therefore the stretch of bar 58. Portion 65 may be fixed to the stretch of bar 58o, directly, be an end thereof, while portion 66 will be fixed firmly to the chassis of the vehicle.

FIGS. 19 to 21 illustrate another alternative which allows the entering of the driver to the vehicle. In this case, the orbital bar 72 discloses a pivoting stretch 73 which is articulated thereto as indicated inside circle XXI as a magnifying glass of FIG. 19. The joint may consist of two tubular portions 74 and 75 articulated by means of a pin 76 which passes through planar portions 77 and 78 of tubular portions. The planar parts include slotted or radially lobulated inserts 79 and 80 which couple with each other and are held firmly to each other when pressed one against the other. The function of pressing with each other or releasing the coupling between the inserts is in charge of a lever with cam 81, which is well known in the art. At the opposing end of the pivoting stretch 73 any known means of fastening to the chassis of the vehicle may be included to hold the bar 73 in its closed position.

FIGS. 23 to 28 still illustrate another alternative wherein the bar 82 has a sliding stretch 83 between an open position, which defines an entering to the interior of said cage, and a closed position which keeps the ovoid configuration, being this sketch 83 telescopically mounted on said longitudinal bar 82 and showing an end which has a manually operated fastening which is connected with the cage to close said entering. In fact, the stretch 83 discloses two sub-sketches 84 and 85 this one being disposed in a sliding manner inside the first one. The stretch 84 will be fixed to the bar 82 and the stretch 85 can be connected by the free end to a fastening base 86 which will be fixed to any front part of the chassis. The stretch 85 may include a lever 87 which may be put outwardly as indicated in FIG. 24, against the action of an inner spring 88, and may be held in this position to allow the sliding of the stretch 85 inside a slot and may be released again under the load of the spring so that some fixing flanges 90 fit inside the fixing slots 91 as shown in FIGS. 24 and 28.

Figure 29:
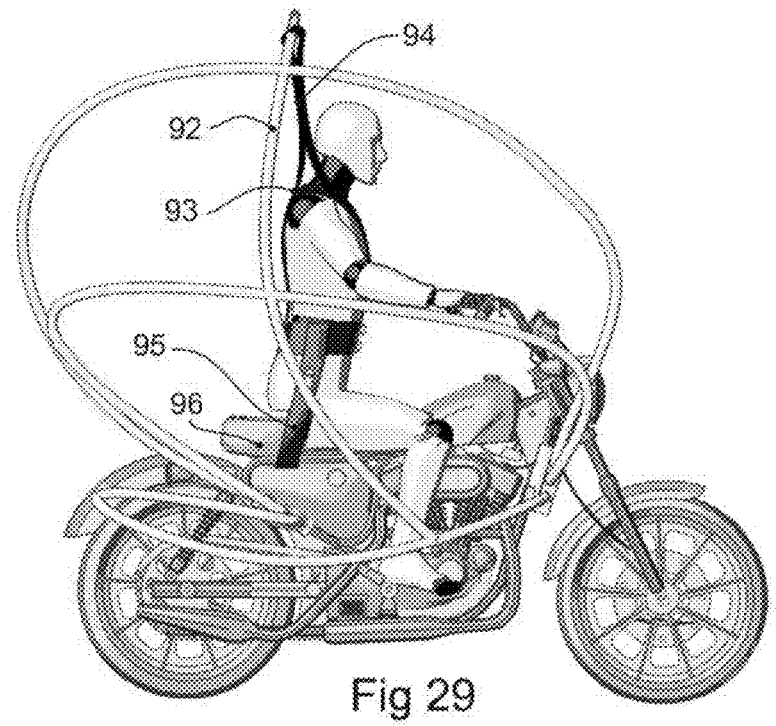
FIG. 29 is an elevational side view of a motorcycle in agreement with another embodiment of the invention which incorporates a safety harness for the driver.
Figure 30:
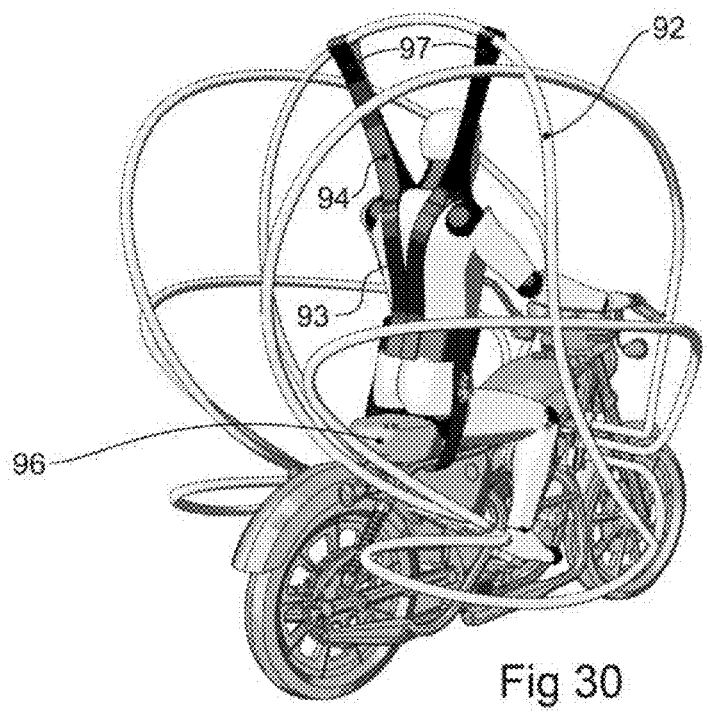
FIG. 30 is a perspective view of the motorbike of FIG. 29.
Figure 31:
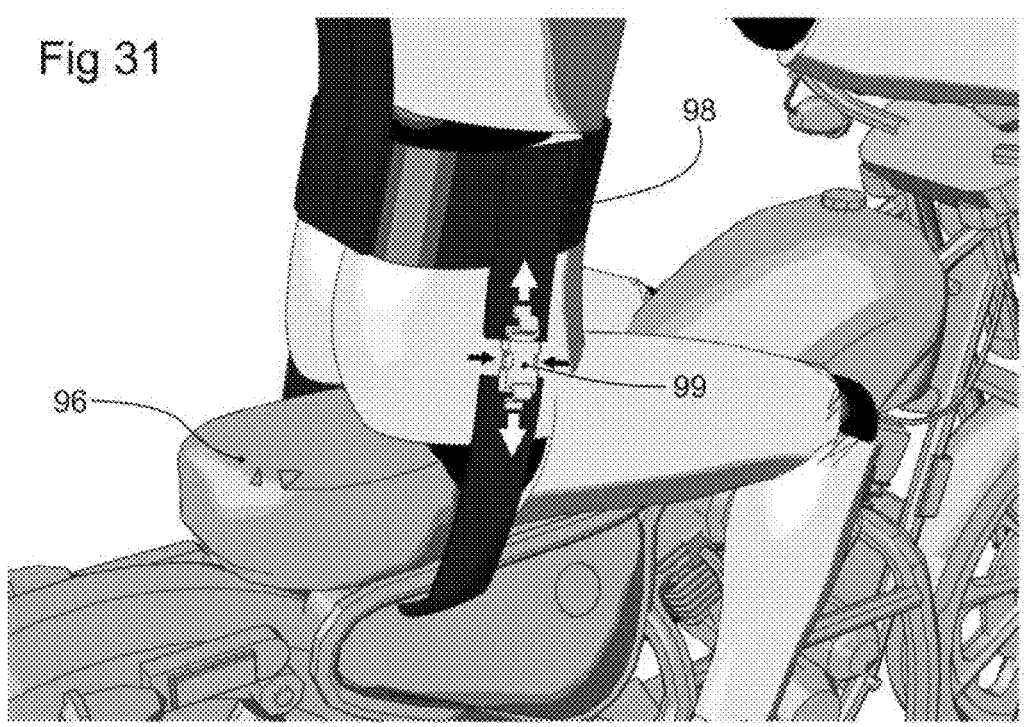
FIG. 31 is a perspective and detailed view of the fastening and shut of the lower part of the harness of the motorbike of FIG. 29.
Figure 32:
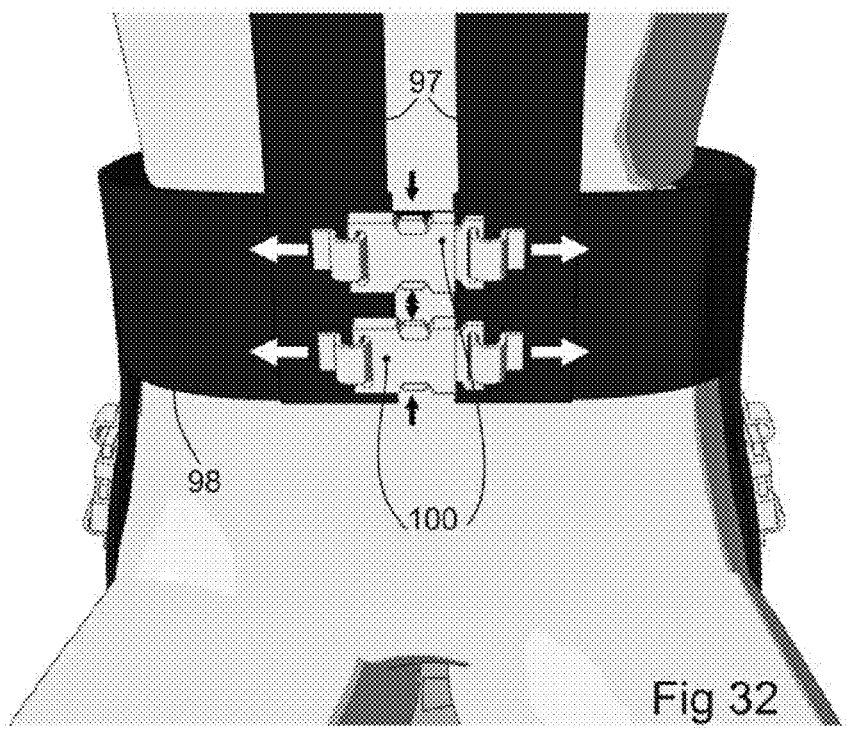
FIG. 32 is a perspective and detailed view of shuts, to be fastened to the driver, of the harness of the motorbike of FIG. 29, and FIGS. 33 through 36 are respectively, perspective, side, front and elevational views, of a quad bike which incorporates a cage in agreement with another embodiment of the invention.
Figure 35:
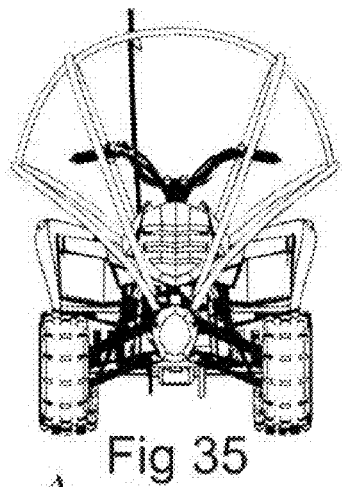
Figure 34:
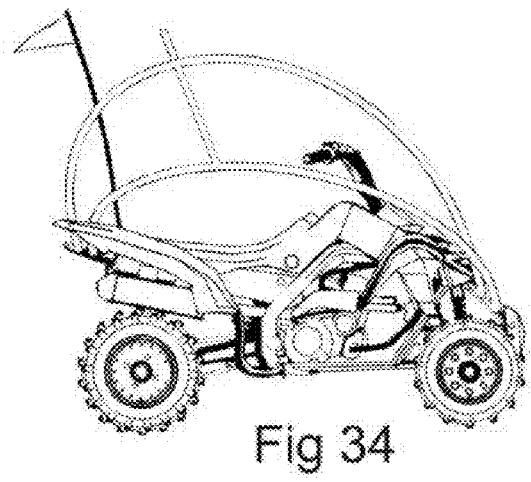
Figure 33:
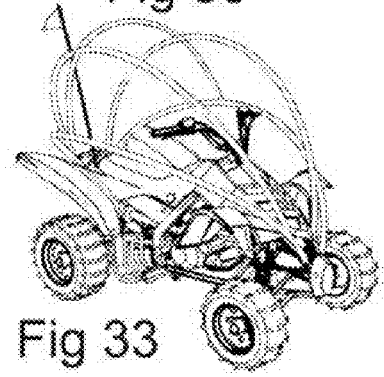
Figure 36:
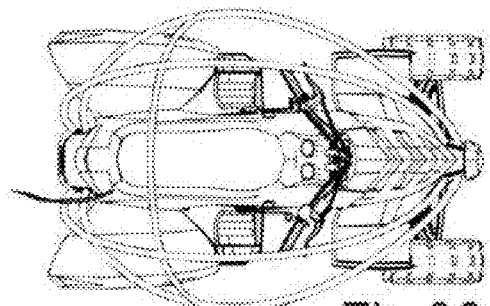

In agreement with another aspect of the invention, the cage of the invention may be provided with protection elements as a safety belt. This way, as illustrated in FIGS. 29 a 32, at least one of said bars, for example the transversal bar 92 includes a safety harness 93 for the driver, showing said harness 93 a first higher part 94 firmly fixed to said bar 92 and a second lower part 95 fixed to said chassis of the vehicle in the seat zone 96, showing said parts of harness safety and adjustment fastenings for the fastening of the driver. The harness will comprise preferably a pair of handles 97 and a belt 98 which will be fixed to the body of the driver by means of belt loops or buckles 99 while the belt will be fixed to the waist of the driver by means of belt loops or buckles 110, which may be of known type.

Finally, FIGS. 33 to 36 illustrate one application of the cage of the invention in a quad cycle vehicle, keeping all the above described features referred to the front and back fixing nucleus, as well as the provision panels, coatings and covers described for the other embodiments.

The cage of the invention could be incorporated to a determined vehicle after its manufacturing or also it may be considered, either totally or partially to be part of a determined vehicle model from its development, by the use of the main fixing structure, which will be fixed to or removable from the vehicle chassis, subject to be incorporated by fastening once individually or in a group to the orbital safety bars.

The cage could incorporate other safety measures and devices in a combined fashion such as the use of helmet, safety clothing, Airbag system and, of course, the hiring of an Insurance and medical coverage will be recommended, forming a complete safety scenery to prevent and alleviate the accidents suffered by personas and/or things related with this type of vehicles nowadays, with the trust that many lives will be saved and the damages and injuries caused in accidents with motor vehicles without body shell will be considerably reduced.

Among the main advantages of the present invention we can mention:

It covers the passengers of the vehicles against crashes and lateral falls at all fronts, caring for all of them, as known cages and the referenced ones do.

It is in both laterals where it shows the higher increase in safety in a basic and necessary say, thus providing protection in the area between knees and the shoulders of the passengers, these being two of the most affected sites in traffic accidents, and this area being determined in human bodies as the most important zone to be protected.

Its aerodynamic ovoid configuration will be better preserved in a whole sense the passengers of the vehicles since it will reduce the impact force exerted by direct crashes, will attenuate the friction caused by displacements and lateral falls in accidents and will provide lower probabilities of damage due to ejections from the vehicle at high speeds, giving the "downturns" a possibility of normalization through the "turn" effect, by securing the passengers to the seat with the safety harness, who will turn until "downturn" stops with more possibility of being harmless.

The combination of encircling structure improved with the belt or harness will finally exert a full and new sense of safety with respect to known cages, protecting the passengers of vehicle from knocks against the safety structure itself, as it would bump the passengers in case of ejects and/or detachments of bodies due to crashes at high speeds.

The lateral coatings of the cage represent a noticeable increase in the capacity of providing safety to passengers, not only protecting them through the main structure, but also from scratches, introduction of sharp iron and/or cutting elements inside the safety perimeter of the bodies of the passengers, a very important aspect for the safety forces.

The concept of cage with "ovoid" shape is applicable and functional for all models of motorbikes, motor tricycles and quad bikes, including the small and medium sized vehicles, being adapted to lower or higher numbers of main pipes to form the safety structure.

The opening systems and general supports for the main structure are novelty as regards the structural development of motor vehicles without body shell, by providing new possibilities related to the design, comfort and specially safety.

Even though the general function of the cage is to provide integral safety at all the collision sites, the function of the removable "roof" of the coating in its higher zone will also be considered, adding the protective function against rain and/or inclemency to the above described safety structure, but in an optional manner, providing the user with the possibility to add it or remove it at will.

The lateral orbital bars may be interrupted as a matter of design or temporarily to act as "door" but they could consist of one piece to better support the weight of a collision or a downturn.

The orbital bars could turn its angle of orientation with respect to the axis of the vehicle, either due to electromagnetic movements and/or merely mechanic adjustments.

The orbital bars could be mechanically removed to be used in a modular and independent manner, desirably in pairs.

The front fixing forms may be divided in two big groups of variants the first destined to motorcycles and vehicles which have the handlebars attached by two main axis to the front wheel, such as front pieces of the vehicle and others to vehicles which have this set of pieces covered by a front chassis. In both cases, the point of support of the orbital bars will vary, in the front or back of the axis of the front wheel. In both cases, the purpose is to constitute orbital limits of an ovoid form covering the fundamental safety perimeters to protect the passengers totally, and/or the front part of the vehicle.

Reinforced panels may be mounted as a Shield, as a covering for fixed or removable orbital in fixed or removable structures of the vehicle chassis.

For the above, it can be stated that the structural cage safety system offers comparative improvements as regards all the prior art cages, mainly due to its characteristic of being removable and detachable, besides of its aerodynamic advantages and the dynamism of impact offered in case of frontal and/or lateral collisions and/or collisions at high speeds, downturns and lateral spinning.

The invention claimed is:

1. An integral protection cage for motor vehicles without a body shell, comprising a plurality of bars which contain the vehicle and its driver in order to protect him in the event of a collision or downturn, the cage characterized in that it comprises:
    at least a first pair of longitudinal tubular, light and removable bars, each one disposed at each side of the vehicle and which lower edge is disposed at a height not higher than the seat of the vehicle;
    at least a second pair of longitudinal tubular, light and removable bars, each one disposed at each side of the vehicle and at a height above the seat of the vehicle;
    at least a transversal bar which extends from one side to another side of the vehicle and at least above said seat, either in a fixed or removable manner;
    wherein said first and second pairs of bars longitudinally extend from the back part of a chassis of the vehicle to the front part of the chassis of the vehicle defining, along with said transversal bar, a substantially ovoid configuration, said ovoid configuration showing its aspheric end directed to the back of the vehicle while its oval end is directed to the front part of the vehicle, being these bars connected to said chassis by means of removable fastenings.

2. The protective cage of claim 1, characterized in that said ovoid configuration shows its longitudinal axis matching the longitudinal geometrical axis of the vehicle and is slightly sloping to the front of the vehicle.

3. The protective cage of claim 1, characterized in that said longitudinal bars have front ends removable fixed to a front fixing nucleus mounted on the front structure of the chassis of the vehicle, and back ends removable fixed to a back fixing nucleus mounted on the structure posterior of the chassis of the vehicle, comprising each one of said nucleus a set of hose clips which show manually operated fixing means and inside which said end are retained of the bars.

4. The protective cage of claim 1, characterized in that between said bars, closing panels extend which are removably fixed in and/or sliding at the bars.

5. The protective cage of claim 1, characterized in that at least one of said longitudinal bars discloses a pivoting stretch between an open position, which defines an entering to the interior of said cage, and a closed position which keeps the ovoid configuration, showing said stretch an end articulated on the longitudinal bar and an opposing end which has a manually operated fastening which is connected with the cage to close said entering.

6. The protective cage of claim 1, characterized in that at least one of said longitudinal bars discloses a sliding stretch between an open position, which defines an entering to the interior of said cage, and a closed position which keeps the ovoid configuration, being this sketch telescopically mounted on said longitudinal bar and showing an end which has a manually operated fastening which is connected with the cage to close said entering.

7. The protective cage of claim 1, characterized in that at least one of said transversal bars and first longitudinal pair include a safety harness for the driver, showing said harness a first higher part firmly fixed to said bars and a second inferior part fixed to said chassis of the vehicle in a seat zone, showing said parts of harness safety and adjustment fastenings for adjustment of the driver.

8. The protective cage of claim 1, characterized in that said at least transversal bar cross-linked with the longitudinal bars and at the cross-linking points that are fixed to each other in a fixed and/or removable manner.

* * * * *